(12) United States Patent
Yu et al.

(10) Patent No.: US 7,841,853 B2
(45) Date of Patent: Nov. 30, 2010

(54) INJECTION MOLDING MACHINE HAVING A HEAT INSULATED BARREL

(75) Inventors: Chiu-ting Yu, Taipei (TW); Hsien-chih Wu, Tapiei (TW); Yu-xiu Wu, JiangSu (TW); Bo-tao Jiang, JiangSu (TW); Shih-chi Hsu, Taipei (TW)

(73) Assignees: Maintek Computer (Suzhou) Co., Ltd., Jiangsu (TW); Pegatron Corporation, Taipei (TW)

( * ) Notice: Subject to any disclaimer, the term of this patent is extended or adjusted under 35 U.S.C. 154(b) by 18 days.

(21) Appl. No.: 12/512,572

(22) Filed: Jul. 30, 2009

(65) Prior Publication Data
US 2010/0028482 A1    Feb. 4, 2010

(30) Foreign Application Priority Data
Aug. 1, 2008    (TW) .............................. 97129388 A

(51) Int. Cl.
*B29C 45/74* (2006.01)
(52) U.S. Cl. ...................................... 425/548; 425/550
(58) Field of Classification Search ................ 425/547, 425/548, 550, 378.1, 378.2, 379.1, 143, 144; 264/211.21, 211.22, 211.23

See application file for complete search history.

(56) References Cited

U.S. PATENT DOCUMENTS

| 4,955,721 A * | 9/1990 | Clark et al. .................... 366/24 |
| 5,955,120 A * | 9/1999 | Deissler ....................... 425/549 |
| 2004/0159980 A1* | 8/2004 | Janssen et al. .............. 425/547 |

* cited by examiner

*Primary Examiner*—Tim Heitbrink
(74) *Attorney, Agent, or Firm*—Thomas, Kayden, Horstemeyer & Risley, LLP

(57) ABSTRACT

This invention discloses an injection molding machine and a heat-insulating structure of a barrel thereof. The heat-insulating structure covers the barrel of the injection molding machine. The heat-insulating structure includes a plurality of heat-insulating units and a plurality of heat-resistant interlinings. The heat-insulating units are disposed on an outer surface of the barrel in turn along an axial direction of the barrel. The heat-resistant interlinings are located between the heat-insulating units and connect the heat-insulating units, respectively. Each heat-insulating unit includes a heat-resistant layer, a heat-insulating material layer, and an insulating layer in turn. The heat-resistant layer covers the outer surface of the barrel of the injection molding machine.

20 Claims, 7 Drawing Sheets

INJECTION MOLDING MACHINE HAVING A HEAT INSULATED BARREL

CROSS-REFERENCE TO RELATED APPLICATIONS

This Non-provisional application claims priority under 35 U.S.C. §119(a) on Patent Application No. 097129388 filed in Taiwan, Republic of China, the entire contents of which are hereby incorporated by reference.

BACKGROUND OF THE INVENTION

1. Field of the Invention

The invention relates to a heat-insulating structure and, more particularly, to an injection molding machine and a heat-insulating structure of a barrel thereof.

2. Description of the Related Art

In plastic manufacturing industry, injection molding is the most common manufacturing method. Generally, plastic is mixed and melted, and then the plastic is pressed and injected into a mold via a barrel.

The barrel is a main heat generating region in an injection molding machine, and a surface temperature of the barrel generally can reach 200° F. However, in a conventional injection molding machine, the barrel is exposed to an operation environment. Therefore, heat generated from the barrel by heat radiation directly dissipates into the operation environment, thereby causing a high temperature of an operation region of the injection molding machine and worsening the operation environment of operators. Further, if the injection molding machine is disposed in a room having an air conditioner, the load of the air conditioner greatly increases, thereby increasing power consumption.

In addition, to obtain plastic injection products with good quality, the temperature, pressure, and flow speed in the process of pressing and injecting the molten plastic need to be well controlled. However, since the barrel is exposed to the operation environment, the temperature of the operation environment has a great effect on the temperature of the molten plastic. In detail, if the temperature of the operation environment is lower, the temperature of the molten plastic decreases, the viscosity of the plastic increases, and the flow speed decreases. Further, as the flow speed decreases, the temperature of the molten plastic decreases, thereby causing a vicious circle. If the temperature of the operation environment is higher, the temperature of the molten plastic decreases less, the viscosity of the plastic increases less, and the flow speed increases. Further, as the flow speed increases, the temperature of the molten plastic decreases less, and the flow speed increases, thereby also causing a vicious circle. Thus, the quality of the injection products is greatly affected.

BRIEF SUMMARY OF THE INVENTION

The objective of this invention is to provide an injection molding machine and a heat-insulating structure of a barrel thereof to improve the prior art.

According to one aspect of the invention, the invention provides a heat-insulating structure of a barrel of an injection molding machine. The barrel has an outer surface. The heat-insulating structure includes a plurality of heat-resistant interlinings and a plurality of heat-insulating units. The heat-insulating units are disposed on the outer surface of the barrel in turn along an axial direction of the barrel. The heat-resistant interlinings are located between the heat-insulating units and connect the heat-insulating units, respectively. Each heat-insulating unit includes a heat-resistant layer, a heat-insulating material layer, and an insulating layer. The heat-resistant layer has a first surface and a second surface. The first surface covers the outer surface of the barrel of the injection molding machine. The heat-insulating material layer is disposed on the second surface of the heat-resistant layer. The insulating layer is disposed on the heat-insulating material layer and is opposite to the heat-resistant layer.

According to another aspect of the invention, the invention provides an injection molding machine. The injection molding machine includes a barrel and a heat-insulating structure. The barrel has an outer surface. The heat-insulating structure covers the outer surface of the barrel. The heat-insulating structure includes a plurality of heat-resistant interlinings and a plurality of heat-insulating units. The heat-insulating units are disposed on the outer surface of the barrel in turn along an axial direction of the barrel. The heat-resistant interlinings are located between the heat-insulating units and connect the heat-insulating units, respectively. Each heat-insulating unit includes a heat-resistant layer, a heat-insulating material layer, and an insulating layer. The heat-resistant layer has a first surface and a second surface. The first surface covers the outer surface of the barrel of the injection molding machine. The heat-insulating material layer is disposed on the second surface of the heat-resistant layer. The insulating layer is disposed on the heat-insulating material layer and is opposite to the heat-resistant layer.

To sum up, according to the injection molding machine of the invention, the heat-insulating units respectively including a plurality of layers cover the outer surface of the barrel one after another, thus to insulate the heat generated from the barrel by heat radiation in the operation of the injection molding machine, to reduce the temperature of the operation region, and to reduce power consumption of the air conditioner in the operation region. At the same time, the effect of the temperature of the operation environment on the temperature in the barrel can decrease, thereby improving quality of injection products.

These and other features, aspects, and advantages of the present invention will become better understood with regard to the following description, appended claims, and accompanying drawings.

DETAILED DESCRIPTION OF THE INVENTION

Figure 1:
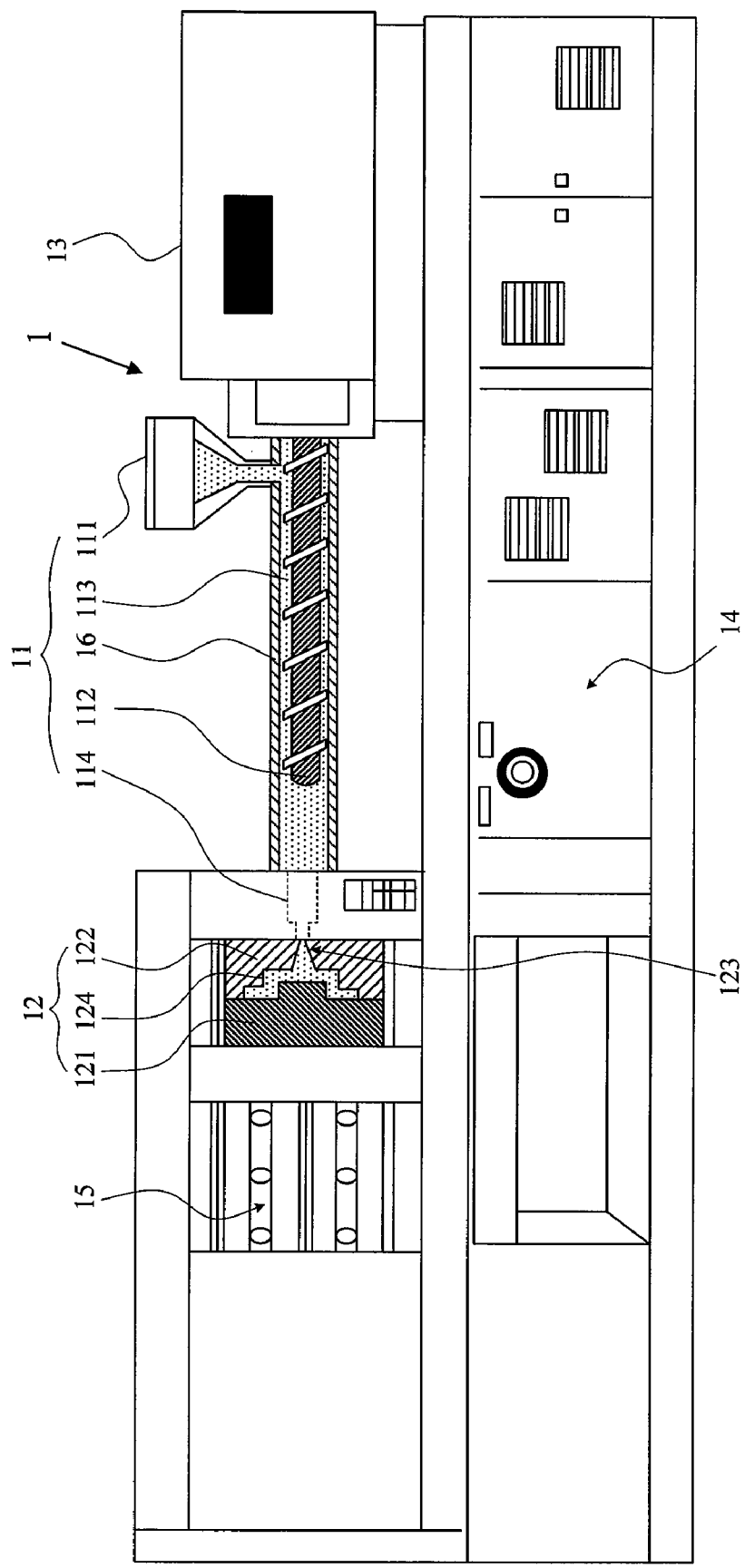
FIG. 1 is a schematic diagram showing an injection molding machine according to a preferred embodiment of the invention.

FIG. 1 is a schematic diagram showing an injection molding machine according to a preferred embodiment of the invention. Please refer to FIG. 1. In the embodiment, an oil hydraulic injection molding machine is taken for example. The injection molding machine 1 in the embodiment includes an injection system 11, a mold system 12, an oil hydraulic system 13, a control system 14, a clamping system 15, and a heat-insulating structure 16.

The control system 14 controls the whole molding operation in cooperation with plastic injection conditions and process analyses of the injection molding machine 1.

The clamping system 15 is responsible for a mold closing action and a mold opening action of the injection molding machine 1.

In the embodiment, the injection system 11 includes a hopper 111, a reciprocating screw 112, a barrel 113, and a nozzle 114.

The mold system 12 is disposed between the injection system 11 and the clamping system 15. In the embodiment, the mold system 12 includes a first mold 121, a second mold 122, a sprue 123, and a cavity 124 formed between the first mold 121 and the second mold 122.

The oil hydraulic system 13 provides a pressure during injection molding to assist in the whole molding operation. Thus, the injection system 11 injects plastic into the mold system 12 to press and form a plastic part.

In the embodiment, the heat-insulating structure 16 covers an outer surface of the barrel 113 of the injection system 11.

FIGS. 2A-2E are schematic diagrams showing operation of the injection molding machine according to a preferred embodiment of the invention. Please refer to FIGS. 2A-2E at the same time.

Figure 2A:
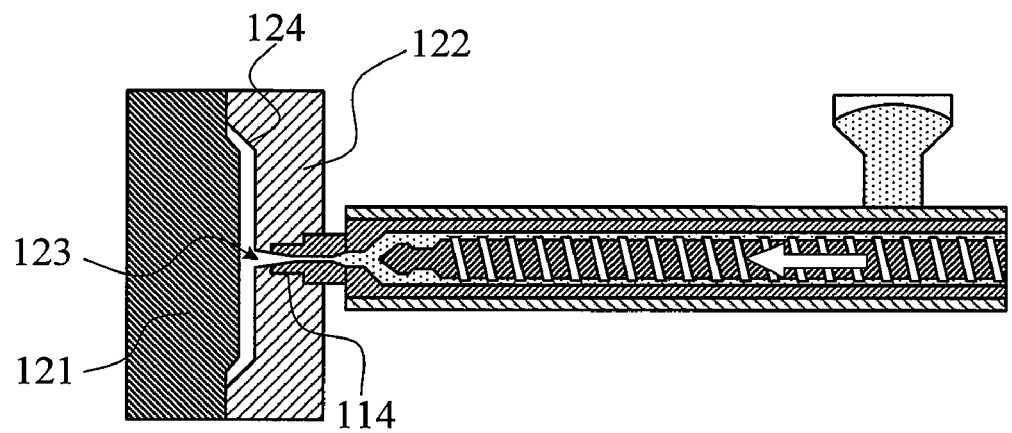
FIGS. 2A-2E are schematic diagrams showing operation of an injection molding machine according to a preferred embodiment of the invention.

First, in FIG. 2A, under the control of the clamping system 15 (as shown in FIG. 1), the first mold 121 of the mold system 12 moves toward the second mold 122, thereby forming a closed state. A cavity 124 is formed between the first mold 121 and the second mold 122 to receive injection of raw materials. At the same time, the nozzle 114 of the injection system 11 is against the sprue 123 of the mold system 12.

Figure 2B:
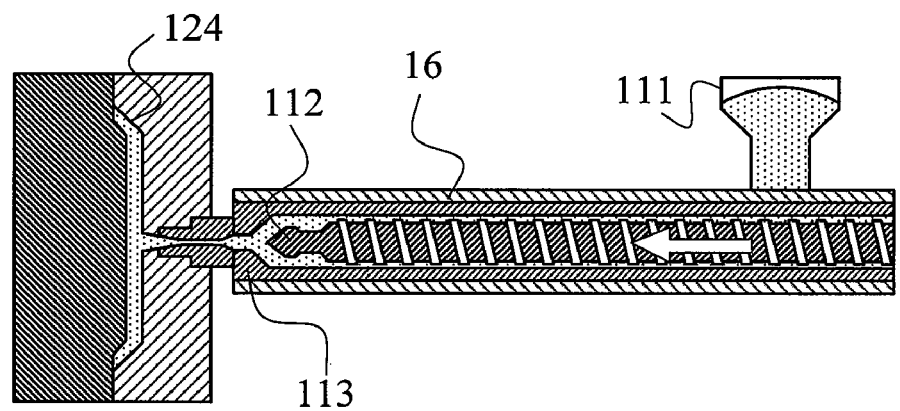

In FIG. 2B, the granular raw materials are fed into the barrel 113 from the hopper 111 via the reciprocating screw 112, and the raw materials are heated and melted. Then, the molten raw materials are injected into the cavity 124 via the reciprocating screw 112. In the process, since the outer surface of the barrel 113 is covered by the heat-insulating structure 16, the heat generated from the barrel 113 by heat radiation can be insulted from an external operation environment, and the temperature of the whole barrel 113 can keep the same.

Figure 2C:
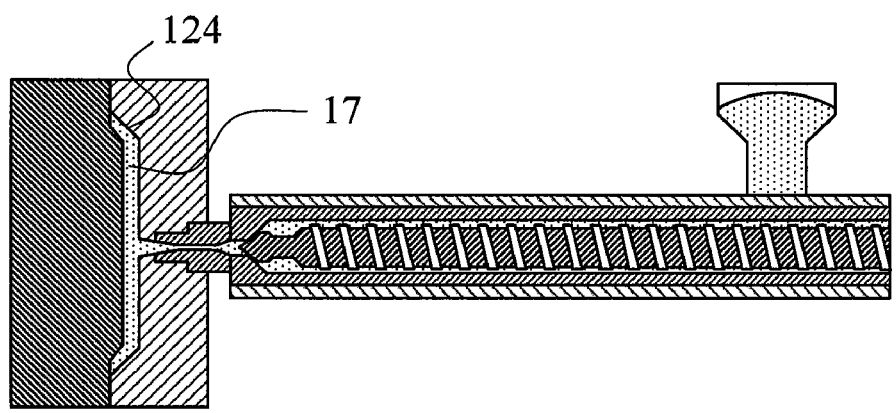

In FIG. 2C, an injection pressure is maintained in the cavity 124 to avoid a reverse flow of the raw materials and shrinkage of the plastic part 17.

Figure 2D:
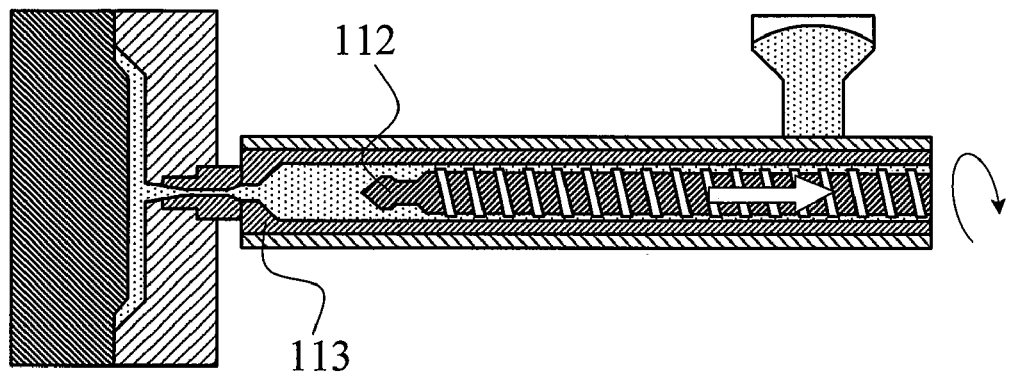

In FIG. 2D, first, the reciprocating screw 112 moves backwards for a certain distance. Then the granular raw materials are fed into the barrel 113 by the rotation of the reciprocating screw 112, and they are heated and melted. After the raw materials are fed, the reciprocating screw 112 continues moving backwards for a certain distance.

Figure 2E:
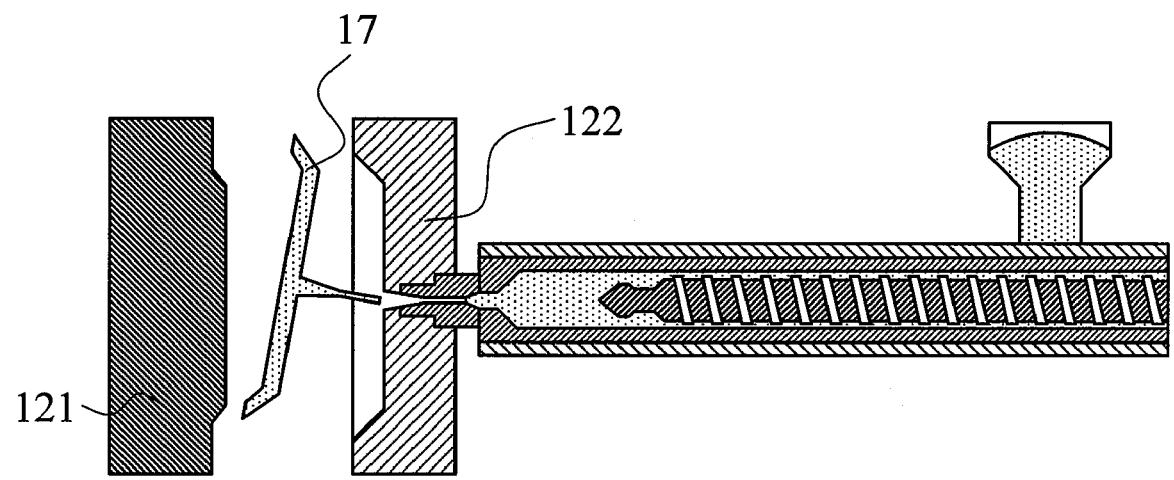

Finally, in FIG. 2E, after the plastic part 17 cools and solidifies, the first mold 121 is separated from the second mold 122, and the solidified plastic part 17 is ejected. Then, a next circle can be performed according to the above steps.

Figure 3:
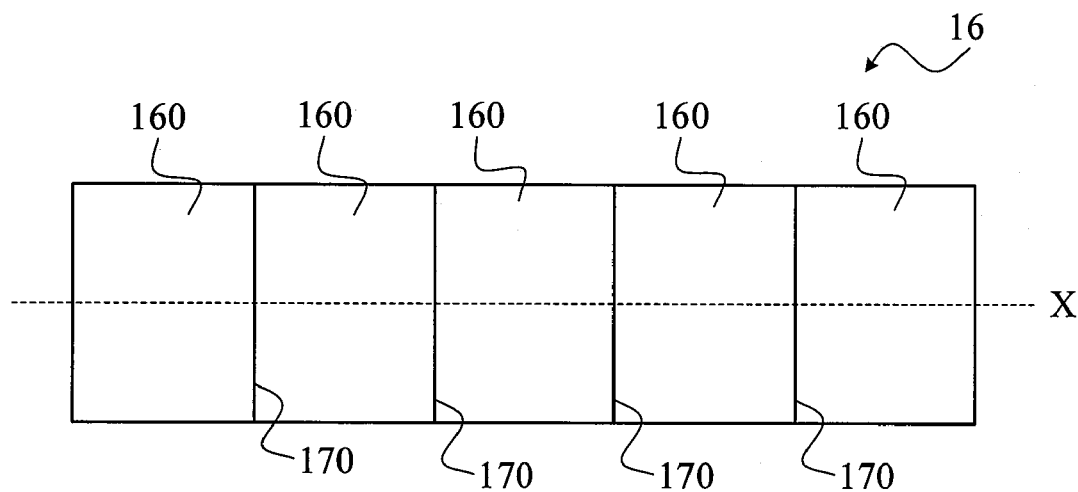
FIG. 3 is a schematic diagram showing a heat-insulating structure according to a preferred embodiment of the invention.

FIG. 3 is a schematic diagram showing a heat-insulating structure according to a preferred embodiment of the invention. Please refer to FIG. 3. In the embodiment, the heat-insulating structure 16 includes a plurality of heat-insulating units 160 and a plurality of heat-resistant interlinings 170. The heat-insulating units 160 are disposed in turn along an axial direction X of the barrel 113. The heat-resistant interlinings 170 are used to connect each of the heat-insulating units 160. In the embodiment, the heat-insulating structure 16 including five heat-insulating units 160 is taken for example. However, the invention is not limited thereto.

Since the heat-insulating structure 16 in the embodiment includes a plurality of heat-insulating units 160 connected one after another, it is flexible. Thus the heat-insulating structure 16 facilitates installation. Further, in the embodiment, the heat-resistant interlinings 170 are used to connect the heat-insulating units 160, thereby effectively preventing dissipation of the heat.

Figure 4:
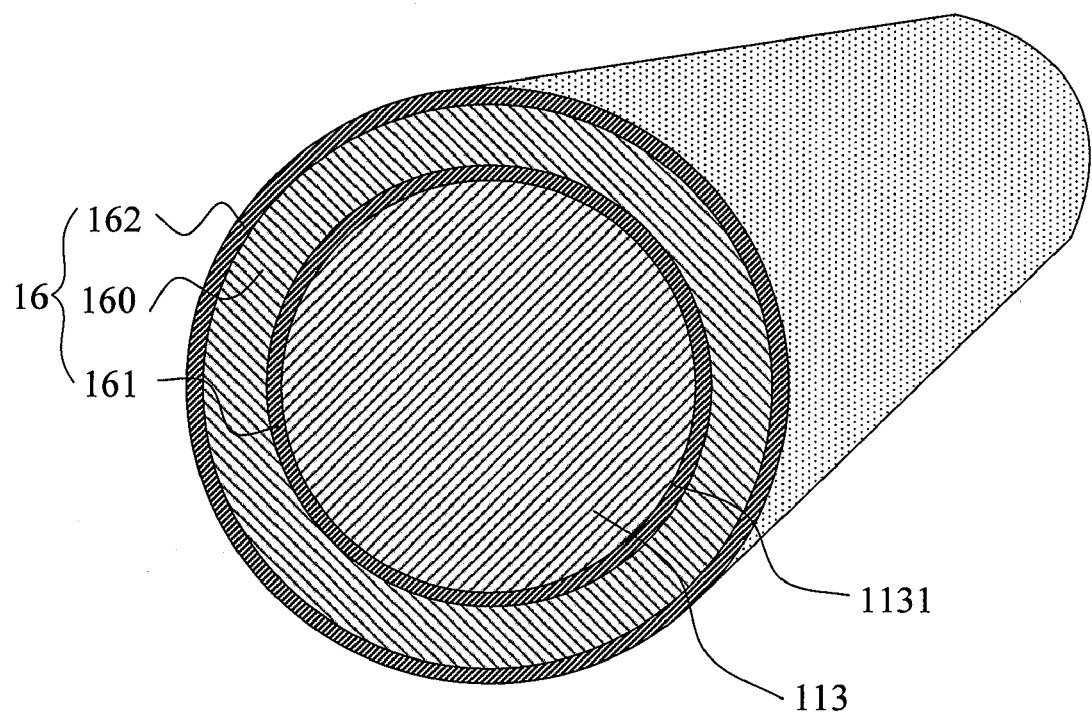
FIG. 4 is a schematic diagram showing a heat-insulating structure covering a barrel according to a preferred embodiment of the invention.

FIG. 4 is a schematic diagram showing a heat-insulating structure covering a barrel according to a preferred embodiment of the invention. Please refer to FIG. 3 and FIG. 4 together. In the embodiment, the heat-insulating structure 16 includes a plurality of heat-insulating units 160, an inner jacket 161, and an outer jacket 162.

In the embodiment, the inner jacket 161 can cover an outer surface 1131 of the barrel 113. The outer jacket 162 can be directly exposed to the external operation environment. The heat-insulating units 160 are disposed between the inner jacket 161 and the outer jacket 162.

In the embodiment, in addition to insulation of the heat-insulting units 160, the heat resistance of the heat-insulting units 160 is also considered in cooperation with the temperature of the barrel 113.

Thereby, the outer surface 1131 of the barrel 113 is covered by a heat-insulating structure 16, thus to reduce possible heat radiation regions and to save energy. At the same time, since the barrel 113 covered by the heat-insulating structure 16 can be regarded as an independent system, the barrel 113 can maintain a certain temperature, which benefits injection quality of the injection molding machine.

Figure 5:
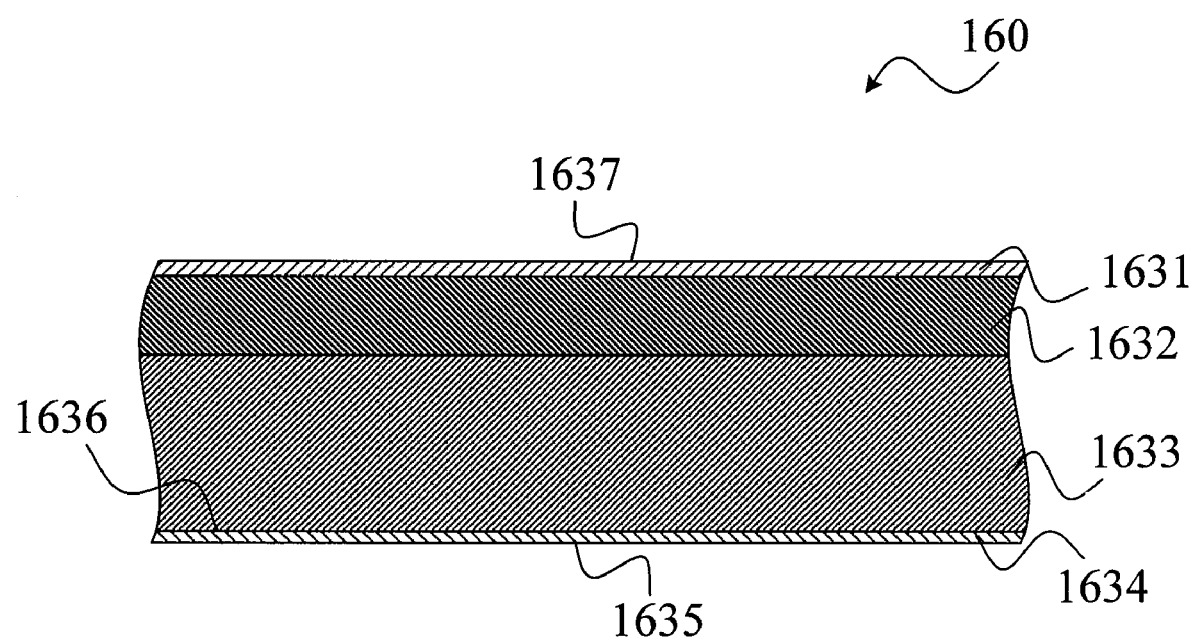
FIG. 5 is a structural schematic diagram showing a heat-insulating unit in FIG. 4.

FIG. 5 is a structural schematic diagram showing the heat-insulating unit 160 in FIG. 4. Please refer to FIG. 5. In the embodiment, the heat-insulating unit 160 includes an insulating layer 1631, a reflecting layer 1632, a heat-insulating material layer 1633, and a heat-resistant layer 1634 from outside to inside. The layers can be sewn together by a high-temperature thread. The thread can keep working and avoid burning out and carbonization under a high temperature of 700° F. In addition, a third surface 1637 (that is the outer surface) of the insulating layer 1631 can be connected to an inner surface of the outer jacket 162 (as shown in FIG. 4). A first surface 1635 of the heat-resistant layer 1634 can be connected to an outer surface of the inner jacket 161 (as shown in FIG. 4). A second surface 1636 of the heat-resistant layer 1634 can be connected to the heat-insulating material layer 1633.

In the embodiment, the insulating layer 1631 is made of Polytetrafluoroethylne (PTFE), and the thickness is about 0.4 mm. The insulating layer 1631 is an outermost layer. That is, the insulating layer 1631 is farthest away from the heat source than the other material layers. Therefore, the insulating layer 1631 can have lower high-temperature resistance. For example, the insulating layer 1631 may be resistant to a high temperature of 300☐. However, the insulating layer 1631 should be more waterproof and insulating than the other layers. However, the invention is not limited thereto. The insulating layer 1631 may be made of other materials, as long as the insulating layer 1631 can satisfy the certain high-temperature resistance, waterproofing, and insulation.

In the embodiment, the reflecting layer 1632 can reflect heat to strengthen a heat-insulating function of the heat-insulating unit 160. The reflecting layer 1632 can be made of an aluminum foil fiberglass cloth having a thickness of about 1 mm and resistant to a high temperature of 500° F. However, the invention is not limited thereto. The reflecting layer 1632 may be made of other materials, or the reflecting layer 1632 may not be used.

In the embodiment, the heat-insulating material layer 1633 is a main heat-insulating layer. Therefore, the heat-insulating material layer 1633 needs the higher heat resistance. For example, the heat-insulating material layer 1633 may be made of a ceramic fiber blanket having a thickness of about 25 mm and resistant to a high temperature of 1260° F. However, the invention is not limited thereto. The heat-insulating material layer 1633 may be made of other materials such as asbestos, a porous material and so on.

In the embodiment, the heat-resistant layer 1634 is closer to the heat source than the insulating layer 1631. Therefore, the heat-resistant layer 1634 needs the higher heat resistance. The heat-resistant layer 1634 can be made of a high-temperature resistant cloth which can continue working under a high temperature of 700° F. and avoid deformation and carbonization. However, the invention is not limited thereto. The heat-resistant layer 1634 can be made of other materials, as long as the heat-resistant layer 1634 can satisfy the certain high-temperature resistance.

Please refer to FIG. 1. In the preferred embodiment of the invention, an injection molding machine of a 550 tons JSW J550ELIII type from Japan Steel Works is used as a testing machine. The beneficial effect of the invention is described by comparison of the temperature changes in two states that the barrel 113 is exposed to the operation environment and the barrel 113 is covered by the heat-insulating structure 16 in FIG. 3. In the two states, a digital panel (not shown) of the injection molding machine 1 is set to control the temperature of the injection molding machine 1 to increase from 150° F. to 300° F. and to preserve the temperature for 30 minutes.

From the heating-up process to the heat preservation process in the two states, a temperature-sensing probe of a temperature data collector is attached to a surface of the barrel 113 via a heat-resisting tape. At the same time, an infrared thermal imaging device and a contact thermodetector are used to measure and analyze the temperature in the barrel 113 and the temperature of the outer surface of the barrel 113. Further, an indoor temperature and heating-up time are also measured.

The result of the test indicates that when the barrel 113 is exposed to the operation environment, the indoor temperature is 31° F., and the temperature of the area 1 m away from the barrel 113 is 37° F., and when the barrel 113 is covered by the heat-insulating structure 16, the indoor temperature is 29° F., and the temperature of the area 1 m away from the barrel 113 is 29.6° F. According to the above, after the heat-insulating structure 16 in the embodiment is used, the temperature of the operation environment around the barrel 113 decreases 7.4° F., which greatly improves the operation environment of the operators.

At the same time, when the barrel 113 is exposed to the operation environment, the heating-up time of the injection molding machine 1 is 43 minutes. When the barrel 113 is covered by the heat-insulating structure 16, the heating-up time of the injection molding machine 1 is shortened to 26 minutes. Thus, after the heat-insulating structure 16 in the embodiment is used, the operation efficiency of the injection molding machine 1 improves 39.5%.

In addition, when the barrel 113 is exposed to the operation environment, the average temperature of the outer surface of the barrel 113 is 257☐. When the barrel 113 is covered by the heat-insulating structure 16, the average temperature of the outer surface of the barrel 113 decreases to 70° F. Therefore, after the heat-insulating structure 16 in the embodiment is used, the heat-insulating effect of the barrel 113 increases 72.7%.

Figure 6A:
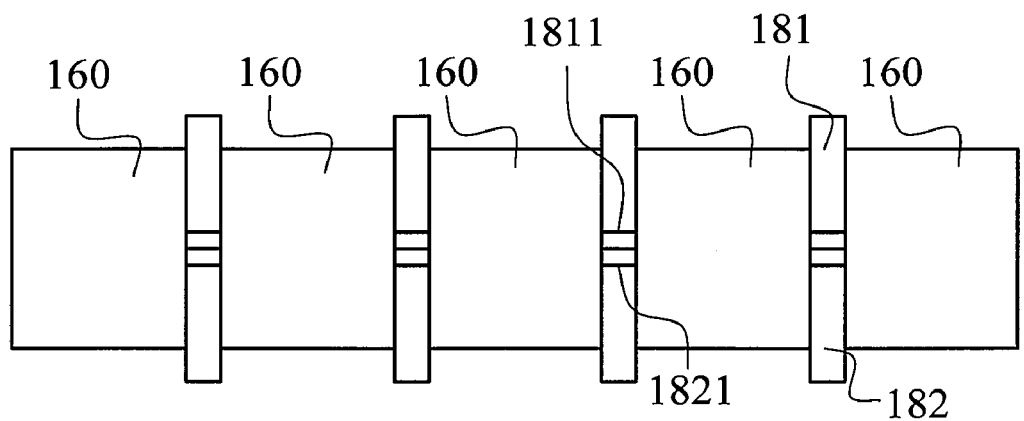
FIG. 6A is a front view of an assembling schematic diagram showing a heat-insulating structure and a barrel according to a preferred embodiment of the invention.
Figure 6B:
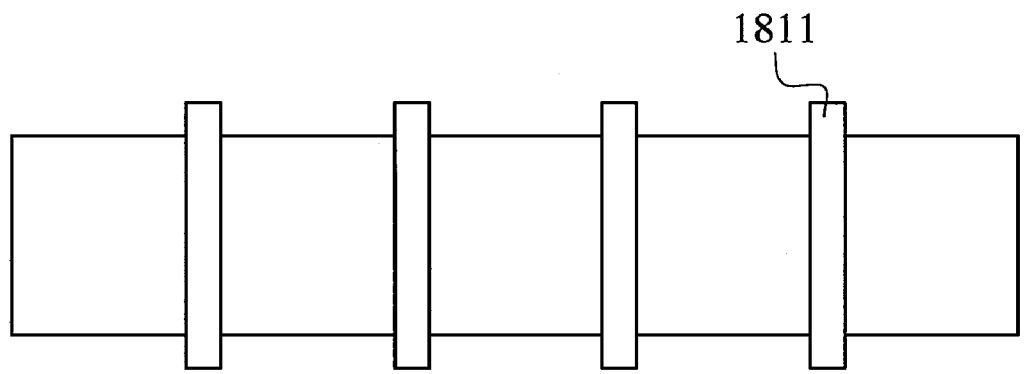
FIG. 6B is a top view of an assembling schematic diagram showing a heat-insulating structure and a barrel according to a preferred embodiment of the invention.
Figure 6C:
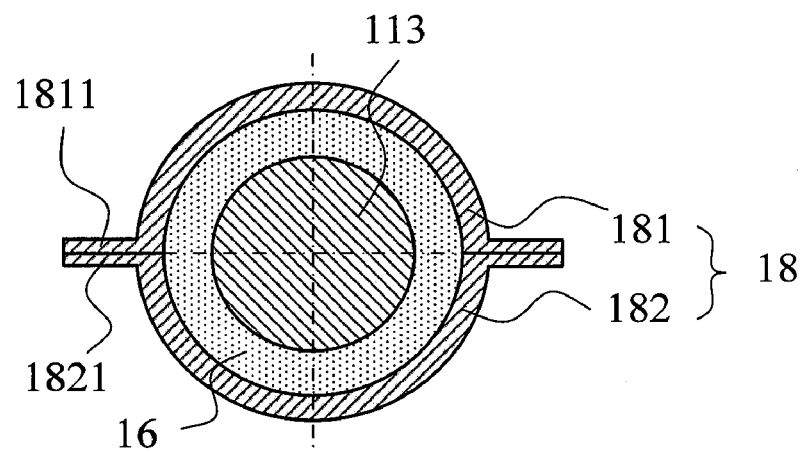
FIG. 6C is a left view of an assembling schematic diagram showing a heat-insulating structure and a barrel according to a preferred embodiment of the invention.

FIG. 6A is a front view of an assembling schematic diagram showing a heat-insulating structure and a barrel according to a preferred embodiment of the invention. FIG. 6B is a top view of the assembling schematic diagram showing the heat-insulating structure and the barrel according to a preferred embodiment of the invention. FIG. 6C is a left view of the assembling schematic diagram showing the heat-insulating structure and the barrel according to a preferred embodiment of the invention. Please refer to FIGS. 6A-6C together.

To limit the movement of the heat-insulating structure 16, a plurality of fastening units 18 are sleeved on the outer surface of the heat-insulating structure 16, respectively. In the embodiment, the fastening units 18 can be sleeved on the connection places of each of the heat-insulating units 160. In detail, when the heat-insulating structure 16 includes the outer jacket 162, the fastening units 18 can be sleeved on the outer surface of the outer jacket 162 (as shown in FIG. 4). When the heat-insulating structure 16 does not include the outer jacket 162, the fastening units 18 can be sleeved on the third surface 1637 of the insulating layer 1631 of the heat-insulating unit 160 (as shown in FIG. 5).

The fastening unit 18 includes a first annular main body 181 and a second annular main body 182. In the embodiment, the first annular main body 181 and the second annular main body 182 are semicircular, and they extend outside to form a first flange 1811 and a second flange 1821, respectively. The inner diameters of the first annular main body 181 and the second annular main body 182 are approximately equal to the outer diameter of the heat-insulating structure 16. Thus, the movement of the heat-insulating structure 16 is limited.

In the embodiment, when the fastening unit 18 is fastened to the heat-insulating structure 16, the first annular main body 181 of the fastening unit 18 can be sleeved on a upper portion of the outer surface of the heat-insulating structure 16, and the second annular main body 182 of the fastening unit 18 can correspondingly be sleeved on a lower portion of the outer surface of the heat-insulating structure 16. Finally, the first flange 1811 of the first annular main body 181 and the second flange 1821 of the second annular main body 182 can be fastened to each other, thereby fastening the fastening unit 18 to the heat-insulating unit 16

In the embodiment, although the fastening units 18 are sleeved on the connection places of each of the heat-insulating units 160, the invention does not limit the positions and the number of the fastening units 18. Further, the first annular main body 181 and the second annular main body 182 of the fastening unit 18 may be disposed, respectively, and they may also be integrally formed. However, the invention is not limited thereto.

Figure 7A:
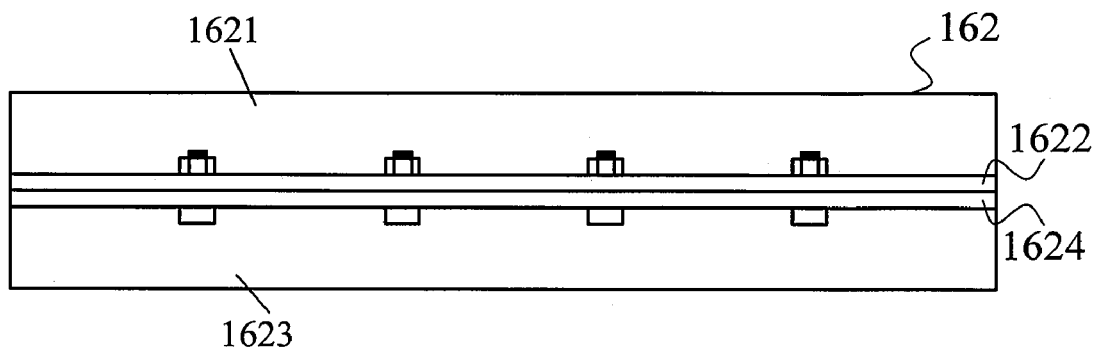
FIG. 7A is a front view of an assembling schematic diagram showing a heat-insulating structure and a barrel according to another preferred embodiment of the invention.
Figure 7B:
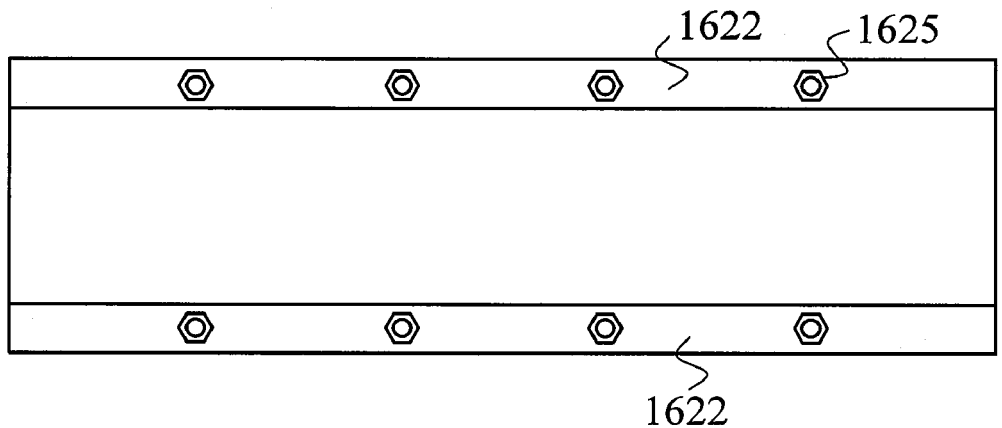
FIG. 7B is a top view of an assembling schematic diagram showing a heat-insulating structure and a barrel according to another preferred embodiment of the invention.
Figure 7C:
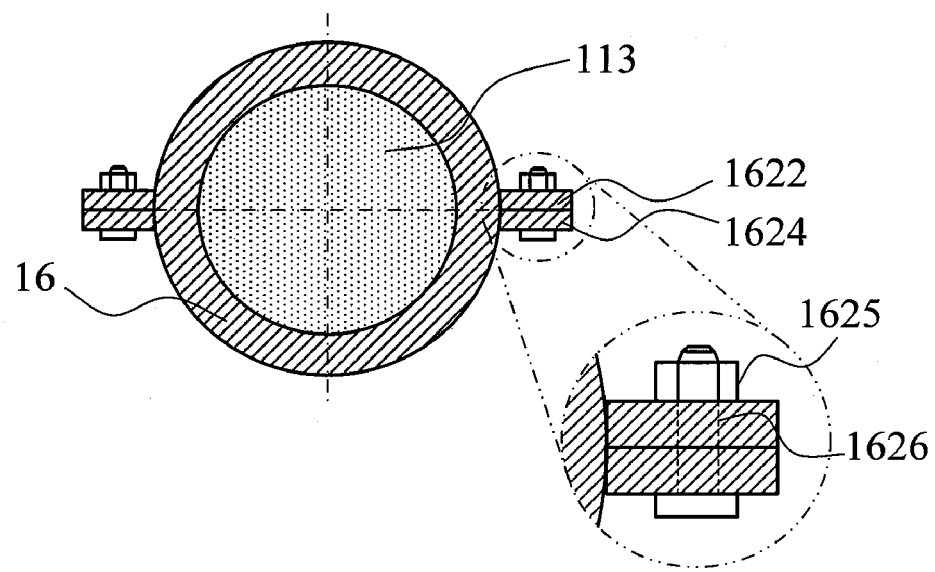
FIG. 7C is a left view of an assembling schematic diagram showing a heat-insulating structure and a barrel according to another preferred embodiment of the invention.

FIG. 7A is a front view of an assembling schematic diagram showing a heat-insulating structure and a barrel according to another preferred embodiment of the invention. FIG. 7B is a top view of the assembling schematic diagram showing the heat-insulating structure and the barrel according to another preferred embodiment of the invention. FIG. 7C is a left view of the assembling schematic diagram showing the heat-insulating structure and the barrel according to another preferred embodiment of the invention. Please refer to FIGS. 7A-7C together.

In the embodiment, the positioning function of the heat-insulating structure 16 is realized by itself. In detail, when the heat-insulating structure 16 includes the outer jacket 162, since the material of the outer jacket 162 is hard, the outer jacket 162 can be used to position the heat-insulating structure 16.

In the embodiment, the outer jacket 162 includes a first main body 1621 and a second main body 1623. In the embodiment, the first main body 1621 may be an upper portion of the outer jacket 162, and the second main body 1623 may be a lower portion of the outer jacket 162. However, the invention is not limited thereto. Further, the first main body 1621 and the second main body 1623 extend outside to form a plurality of first extending portions 1622 and a plurality of second extending portions 1624, respectively. Thus, the movement of the heat-insulating structure 16 can be limited.

In the embodiment, if the heat-insulating structure 16 needs to be firmly positioned, the first extending portion 1622 can be connected with the second extending portion 1624 correspondingly, and a screw 1625 is inserted into screw holes 1626 of the first extending portion 1622 and the second extending portion 1624. However, the invention is not limited thereto. Other fastening elements can be used to fasten the first extending portion 1622 and the second extending portion 1624. In addition, the invention does not limit the number of the first extending portion 1622 and the second extending portion 1624.

To sum up, in the preferred embodiment of the invention, the heat-insulating structure including a plurality of heat-insulating units connected one after another is used for covering the barrel of the injection molding machine. Further, the heat-insulating structure mainly includes a plurality of layers for insulating heat radiation energy generated by the barrel in the operation of the injection molding machine, thus to reduce the temperature of the operation environment. In addition, the temperature of the whole barrel keeps the same to improve quality of plastic injection products.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A heat-insulating structure of a barrel of an injection molding machine, the barrel having an outer surface, the heat-insulating structure comprising:
    a plurality of heat-resistant interlinings; and
    a plurality of heat-insulating units disposed on the outer surface of the barrel in turn along an axial direction of the barrel, the heat-resistant interlinings being located between the heat-insulating units and connecting the heat-insulating units, respectively, each heat-insulating unit including:
        a heat-resistant layer having a first surface and a second surface, the first surface covering the outer surface of the barrel;
        a heat-insulating material layer disposed on the second surface of the heat-resistant layer; and
        an insulating layer disposed on the heat-insulating material layer.

2. The heat-insulating structure according to claim 1, wherein each heat-insulating unit further includes a reflecting layer disposed between the insulating layer and the heat-insulating material layer.

3. The heat-insulating structure according to claim 2, wherein the reflecting layer is an aluminum foil fiberglass cloth.

4. The heat-insulating structure according to claim 1, further comprising an inner jacket disposed between the first surface of the heat-resistant layer of each heat-insulating unit and the outer surface of the barrel.

5. The heat-insulating structure according to claim 1, further comprising an outer jacket covering the insulating layer of each heat-insulating unit.

6. The heat-insulating structure according to claim 1, wherein the insulating layer is made of Polytetrafluoroethylne (PTFE).

7. The heat-insulating structure according to claim 1, wherein the heat-resistant layer is a ceramic fiber blanket.

8. The neat-insulating structure according to claim 1, wherein the heat-insulating material layer is a high-temperature resistant cloth.

9. The heat-insulating structure according to claim 1, wherein the heat-resistant layer, the heat-insulating material layer, and the insulating layer are sewn with a high-temperature thread.

10. An injection molding machine comprising:
    a barrel having an outer surface; and
    a heat-insulating structure covering the outer surface of the barrel, the heat-insulating structure including:
        a plurality of heat-resistant interlinings; and
        a plurality of heat-insulating units disposed on the outer surface of the barrel in turn along an axial direction of the barrel, the heat-resistant interlinings being located between the heat-insulating units and connecting the heat-insulating units, respectively, each heat-insulating unit including:
            a heat-resistant layer having a first surface and a second surface, the first surface covering the outer surface of the barrel;
            a heat-insulating material layer disposed on the second surface of the heat-resistant layer; and
            an insulating layer disposed on the heat-insulating material layer.

11. The injection molding machine according to claim 10, further comprising a fastening unit, the insulating layer having a third surface, the fastening unit including:
    a first annular main body sleeved on the third surface of the insulating layer and having a first flange; and
    a second annular main body sleeved on the third surface of the insulating layer and connected to the first annular main body, the second annular main body having a second flange, the second flange of the second annular main body and the first flange of the first annular main body fastened to each other.

12. The injection molding machine according to claim 10, wherein each heat-insulating unit further includes a reflecting layer disposed between the insulating layer and the heat-insulating material layer.

13. The injection molding machine according to claim 12, wherein the reflecting layer is an aluminum foil fiberglass cloth.

14. The injection molding machine according to claim 10, wherein the heat-insulating structure further includes an inner jacket disposed between the first surface of the heat-resistant layer of each heat-insulating unit and the outer surface of the barrel.

15. The injection molding machine according to claim 10, wherein the heat-insulating structure further includes an outer jacket covering the insulating layer.

16. The injection molding machine according to claim 15, wherein the insulating layer has a third surface, and the outer jacket of the heat-insulating structure includes:
 a first main body sleeved on the third surface of the insulating layer and having a first extending portion; and
 a second main body sleeved on the third surface of the insulating layer and connected to the first main body, the second main body having a second extending portion, the second extending portion of the second main body and the first extending portion of the first main body fastened to each other.

17. The injection molding machine according to claim 10, wherein the insulating layer of the heat-insulating structure is made of Polytetrafluoroethylne (PTFE).

18. The injection molding machine according to claim 10, wherein the heat-resistant layer of the heat-insulating structure is a ceramic fiber blanket.

19. The injection molding machine according to claim 10, wherein the heat-insulating material layer of the heat-insulating structure is a high-temperature resistant cloth.

20. The injection molding machine according to claim 10, wherein the heat-resistant layer, the heat-insulating material layer, and the insulating layer are sewn with a high-temperature thread.

* * * * *